United States Patent [19]

Piejko et al.

[11] Patent Number: 4,801,669

[45] Date of Patent: Jan. 31, 1989

[54] PROCESS FOR THE QUASI-IONIC POLYMERIZATION OF ACRYLIC ACID DERIVATIVES

[75] Inventors: Karl-Erwin Piejko, Cologne; Ralph Ostarek, Leichlingen; Manfred T. Reetz, Marburg, all of Fed. Rep. of Germany

[73] Assignee: Bayer Aktiengesellschaft, Leverkusen, Fed. Rep. of Germany

[21] Appl. No.: 132,525

[22] Filed: Dec. 14, 1987

[30] Foreign Application Priority Data

Dec. 20, 1986 [DE] Fed. Rep. of Germany ....... 3643709

[51] Int. Cl.[4] .............................. C08F 4/00; C08F 4/14
[52] U.S. Cl. ...................................... 526/238; 526/328
[58] Field of Search ........................................ 526/238

[56] References Cited

U.S. PATENT DOCUMENTS

| | | |
|---|---|---|
| 2,356,767 | 8/1944 | Kropa ................................. 526/238 |
| 2,748,083 | 5/1956 | Hollyday, Jr. et al. ............. 526/238 |
| 2,768,147 | 10/1956 | Meis et al. ........................... 526/238 |
| 3,493,500 | 2/1970 | Volk et al. ........................... 526/238 |
| 4,414,372 | 11/1983 | Farnhau et al. ..................... 526/194 |
| 4,508,880 | 4/1985 | Webster ............................... 526/194 |
| 4,626,579 | 12/1986 | Reetz et al. ......................... 526/194 |

FOREIGN PATENT DOCUMENTS 376411  7/1970  U.S.S.R. ............................. 526/238

*Primary Examiner*—Joseph L. Schofer
*Assistant Examiner*—N. Sarofim
*Attorney, Agent, or Firm*—Sprung Horn Kramer & Woods

[57] ABSTRACT

In the process according to the invention for the quasi-ionic polymerization of acrylic acid derivatives in organic solvents with initiators and zinc halides, the zinc halides are dissolved in the acrylic acid derivatives to be polymerized and the other components of the polymerization mixture are combined with this solution.

9 Claims, No Drawings

PROCESS FOR THE QUASI-IONIC POLYMERIZATION OF ACRYLIC ACID DERIVATIVES

The invention relates to an improved process for the quasi-ionic polymerization of acrylic acid derivatives with initiators and zinc halides as electrophilic catalysts.

Processes for the quasi-ionic polymerization of polar monomers with a double bond in the α-position relative to the polar group, in which the polymerization is initiated with the aid of initiators in the presence of electrophilic or nuclearphilic catalysts, are known (see U.S. Pat. Nos. 4,414,372 and 4,508,880, and furthermore DE-OS (German Published Specification) No. 3,504,168 and Macromolecules, 1984 (17), pages 1415–1416). Electrophilic catalysts which have proved particularly suitable for the polymerization of acrylic acid derivatives by quasi-ionic polymerization are zinc halides, since at room temperature they give polymers with a very narrow molecular weight distribution ($M_w/M_n \sim 1.1$) (see Macromolecules loc. cit.). However—because they are sparingly soluble in the organic solvents usually employed for the quasi-ionic polymerization—zinc halides have the disadvantage that they have to be used in very large amounts (10 to 20 mol %, based on the acrylic acid derivatives to be polymerized) in order to achieve technically appropriate polymerization times, or if relatively small amounts of zinc halide (amounts of less than 10 mol %) are used, long reaction times which are difficult to realize technically must be accepted. The polymerization reactions in the heterogeneous polymerization mixtures also have the disadvantage that they can be controlled only with difficulty and therefore lead to results which are difficult to reproduce.

It has now been found that in the quasi-ionic polymerization of acrylic acid derivatives with initiators and zinc halides as electrophilic catalysts, either a very much higher rate of polymerization can be achieved with a given amount of zinc halide or a certain rate of polymerization can be achieved with a very much smaller amount of zinc halide than is in the case in the known processes if it is ensured that the zinc halides are present in the polymerization mixtures not in suspended form, as hitherto, but in dissolved form. In particular, it has been found, surprisingly, that the zinc halides are quite readily soluble in the acrylic acid derivatives to be polymerized and that they cannot be reprecipitated from these solutions on dilution with the organic solvents and/or on addition of the initiator. This means, it has been found that stable homogeneous polymerization solutions are obtained if the zinc halides are first dissolved in some or all of the acrylic acid derivatives to be polymerized and this solution only then is diluted with the envisaged organic solvent and the initiator is added or the solution of the initiator in the organic solvent is added.

In the procedure carried out hitherto for quasiionic polymerization of acrylic acid derivatives with zinc halides as electrophilic catalysts, the zinc halides were first suspended in the solvent and, after addition of the initiator, the acrylic acid derivatives to be polymerized were added to the suspension (see Macromolecules loc. cit.; U.S. Pat. No. 4,626,579 (=German Published Specification No. 3,504,168). Only heterogeneous polymerization mixtures containing the zinc halides in suspended form were obtained in this procedure.

The acrylic acid derivatives can be polymerized at a high rate and in a reliably reproduceable manner with the aid of the homogeneous polymerization solutions obtainable according to the invention.

The invention therefore relates to a process for the quasi-ionic polymerization of acrylic acid derivatives with initiators and zinc halides, which is characterized in that the polymerization is carried out by a procedure in which the zinc halides are dissolved in the acrylic acid derivative to be polymerized and the other components of the polymerization mixture are combined with this solution.

The solutions of the zinc halides in the acrylic acid derivative to be polymerized which are to be used in the process according to the invention are already obtainable by simply stirring the envisaged amount of zinc halide into the entire amount or some of the amount of the acrylic acid derivatives to be polymerized. However, it has proved to be advantageous to heat the zinc halideacrylic acid derivative mixtures to temperatures of 30° to 100° C., preferably 30° to 60° C., in order to accelerate the solution operation.

Solutions of the zinc halides in acrylic acid derivatives which, depending on the zinc halide and acrylic acid derivative used, contain 0.3 to 30% by weight of zinc halide, based on the weight of the solutions, can be prepared with the aid of the acrylic acid derivatives to be used, according to the invention, as solvents for the zinc halides.

In carrying out the polymerization process according to the invention, the zinc halide solutions to be used according to the invention are metered, for example, into the initial solution of the initiator in the inert solvent and—if only some of the acrylic acid derivative to be polymerized has been used to dissolve the zinc halide—into the remainder of the acrylic acid derivative to the polymerized. However, it is also possible to take the solutions, to be used according to the invention, of the zinc halides in the acrylic acid derivatives to be polymerized and then to add solvent and initiator or the solution of the initiator in the solvent. In this procedure, it is also possible to take only some of the zinc halide-acrylic acid derivative solution, to introduce the initiator and the solvent and then to meter in the remainder of the zinc halide-acrylic acid derivative solution.

For the polymerization, the concentrations of the zinc halides in the acrylic acid derivatives are preferably 0.3 to 10% by weight, based on the weight of these solutions.

Of the zinc halides $ZnCl_2$, $ZnBr_2$ and $ZnI_2$ suitable as catalysts, $ZnI_2$ is particularly preferred.

Hydrocarbons, such as toluene or xylene or chlorinated hydrocarbons, such as methylene chloride or 1,1,1-trichloroethane, are preferably used as inert organic solvents in the process according to the invention.

The polymerization process according to the invention can be carried out at temperatures from −50° to +100° C.; the polymerization is preferably carried out at temperatures from 0° to +50° C.

The polymerization according to the invention is carried out, as is customary for ionic polymerization reactions, in an inert gas atmosphere, for example under nitrogen, and with exclusion of moisture.

Representatives of the acrylic acid derivatives to be employed in the process according to the invention which may be mentioned as preferred are: methyl acrylate, sorbyl acrylate, ethyl acrylate, n-, sec. and tert. butyl acrylate, 2-ethylhexyl acrylate, 2-(dimethylamino)-ethyl acrylate, 3,3-dimethoxypropyl acrylate, 3-methacryloxypropyl acrylate, 2-(trimethylsilyloxy)-ethyl acrylate, 2-cyano-ethyl acrylate, 4-fluorophenyl acrylate, 2-(methacryloxy)-ethyl acrylate, 2-chloroethyl acrylate, 2-(propen1-yloxy)-ethyl acrylate, phenyl acrylate and allyl acrylate.

The monomer content of the polymerization solution should be about 1 to 90% by weight, preferably 5 to 50% by weight.

The advantageous effects of the solutions, to be employed in the process according to the invention, of the zinc halides in the acrylic acid derivatives—acceleration of the polymerization, reproduceable course of the polymerization—are independent of the nature of the initiator used. All the initiators known for quasiionic polymerization can therefore be used in the process according to the invention. These initiators are described, for example, in U.S. Pat. No. 4,414,372; 4,508,880 and 4,626,579 (=DE-OS (German Publ. Specification) No. 3,504,168). O-Trisalkylsilyl-ketene acetals and mercaptosilanes are preferably used; of these initiators, those which contain protected functional groups are in turn particularly preferred.

EXAMPLE 1

0.32 g (0.35 mol %, based on the moles of butyl acrylate) of zinc iodide are dried at 80° C./0.1 bar for 3 hours in a 250 ml flask dried by heating in vacuo and equipped with a magnetic stirrer. After cooling to room temperature and flushing with nitrogen, 50 ml of stabilized dried butyl acrylate are added. The mixture is deheated to 50° C., with stirring, until the zinc iodide has dissolved completely (2 hours).

The solution is thermostatically controlled at 0° C. and 110 ml of dry toluene and 5 ml of trimethyl-2-(trimethylsilyloxy)-ethylmercaptosilane are added. The temperature of the polymerization solution thus obtained rises to 5° to 6° C. within a few minutes and then falls back again to 0° to 1° C. After 120 minutes, the polymerization is ended by addition of 5 ml of methanol.

The yield of polymer after removal of the solvent and the unreacted butyl acrylate on a rotary evaporator is 41 g=86 % of theory. $M_w/M_n=1.10$.

The polymerization described above was repeated several times; polybutyl acrylates with the same molecular weight distribution were always obtained in the same yield.

When the polymerization was carried out in the manner customary hitherto with zinc iodide suspended in toluene, the yield after 120 minutes was only 31 g=65% of theory. Mw/Mn=1.15.

EXAMPLE 2

The procedure described in Example 1 was followed, with the only difference that 0.65 g (0.71 mol % of zinc iodide was not employed instead of the 0.32 g of zinc iodide. The polymerization is interrupted after 60 minutes, as described in Example 1.

The yield of polybutyl acrylate is 42 g (=89% of theory).

If this polymerization is carried out in the customary manner, that is to say by first dispersing the zinc iodide in toluene, the yield of polybutyl acrylate after discontinuation of the polymerization after 60 minutes is 30 g (=63% of theory).

After discontinuation of the polymerization after 120 minutes, the yield of polybutylacrylate was 41 g (=86% of theory). On repeating the experiment with discontinuation of the polymerization after 120 minutes, the yield of polybutyl acrylate was only 34 g (=71% of theory). These different yields with the same procedure of the process show the poor reproduceability of this polymerization process.

EXAMPLE 3

1 g of zinc iodide (=1.16 mol %, based on the moles of 2-ethylhexyl acrylate) is dried as described in Example 1 and dissolved in 50 g of 2-ethylhexyl acrylate by stirring at 30° C. for 10 hours.

150 ml of toluene and 1.5 ml of 1-methoxy-2-methyl-1-trimethylsilyloxy-1-propene are taken in a 250 ml flask dried by heating in vacuo and equipped with a magnetic stirrer, and are thermostatically controlled at 22° C. The monomer-zinc iodide solution is metered into the solution in the course of 1 hour. After stirring for 2 hours, 2 ml of methanol are added to the polymerization solution in order to end the polymerization.

The yield of poly-2-ethylhexyl acrylate is 50.5 g (100% of theory).

What is claimed is:

1. A process for the quasi-ionic polymerization of an acrylic acid derivative, wherein the acrylic acid derivative is polymerized in an organic solvent in the presence of an initiator and a zinc halide which process is characterized in that the polymerization is carried out by a procedure in which the zinc halide is dissolved in the acrylic acid derivative to be polymerized and the other components of the polymerization mixture are then combined with this solution.

2. The process of claim 1, wherein the solution of the zinc halide in the acrylic acid derivative is prepared by heating the two components to 30° to 100° C.

3. The process of claim 1, wherein the zinc halide is dissolved in the acrylic acid derivatives in an amount of 0.3 to 30% by weight, based on the weight of the solution.

4. The process of claim 1, wherein the zinc iodide is the zinc halide.

5. The process of claim 1, wherein for the polymerization the concentration of the zinc halide in the acrylic acid derivative is 0.3 to 10% by weight, based on the weight of the solution.

6. A process according to claim 2, wherein the heating is conducted at 30° to 60 ° C.

7. A process according to claim 1, wherein the acrylic acid derivative is selected from the group consisting of methyl acrylate, sorbyl acrylate, ethyl acrylate, n-, sec. and tert. butyl acrylate, 2-ethylhexyl acrylate, 2-(dimethylamino)-ethyl acrylate, 3,3-dimethoxypropyl acrylate, 3-methacryloxypropyl acrylate, 2-(trimethylsilyloxy)-ethyl acrylate, 2-cyano-ethyl acrylate, 4-fluorophenyl acrylate, 2-(methacryloxy)-ethyl acrylate, 2-chloroethyl acrylate, 2-(propen-1-yloxy)-ethyl acrylate, phenyl acrylate and allyl acrylate.

8. A process according to claim 1, wherein the initiator is selected from the group consisting of O-trisalkylsilyl-ketene acetals and mercaptosilanes.

9. A process according to claim 1, wherein the organic solvent is selected from the group consisting of toluene, xylene, methylene chloride and 1,1,1-trichloroethane.

* * * * *